US012053900B2

(12) United States Patent
Shikama et al.

(10) Patent No.: US 12,053,900 B2
(45) Date of Patent: Aug. 6, 2024

(54) CUTTING DEVICE

(71) Applicant: BROTHER KOGYO KABUSHIKI KAISHA, Nagoya (JP)

(72) Inventors: Yasuhito Shikama, Niwa (JP); Naoya Sakai, Nagoya (JP); Kentaro Sugiyama, Gifu (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 133 days.

(21) Appl. No.: 17/702,966

(22) Filed: Mar. 24, 2022

(65) Prior Publication Data

US 2022/0305690 A1 Sep. 29, 2022

(30) Foreign Application Priority Data

Mar. 26, 2021 (JP) ................................ 2021-053547

(51) Int. Cl.

| | |
|---|---|
| ***B26F 1/38*** | (2006.01) |
| ***B26D 7/01*** | (2006.01) |
| ***B26D 7/26*** | (2006.01) |
| *B26D 7/00* | (2006.01) |

(52) U.S. Cl.

CPC ............ *B26F 1/3813* (2013.01); *B26D 7/015* (2013.01); *B26D 7/2628* (2013.01); *B26D 2007/0087* (2013.01); *B26D 2007/2678* (2013.01)

(58) Field of Classification Search

CPC .......... B26D 7/2628; B26D 2007/2678; B26F 1/3813

See application file for complete search history.

(56) References Cited

U.S. PATENT DOCUMENTS

| | | | | |
|---|---|---|---|---|
| 11,389,983 B2 * | 7/2022 | Sugiyama | ................ | B26D 5/00 |
| 2005/0186010 A1 | 8/2005 | Shibata et al. | | |
| 2021/0069834 A1 * | 3/2021 | O'Donnell | ............... | B26D 5/00 |

FOREIGN PATENT DOCUMENTS

| | | | | |
|---|---|---|---|---|
| JP | H02262995 A | 10/1990 | | |
| JP | 2005246562 A | 9/2005 | | |
| WO | WO-2020031421 A1 * | 2/2020 | ............... | B26D 5/12 |
| WO | WO-2021019833 A1 * | 2/2021 | ............. | B26D 5/007 |

* cited by examiner

*Primary Examiner* — Jennifer S Matthews
(74) *Attorney, Agent, or Firm* — K&L Gates LLP

(57) ABSTRACT

A cutting device includes a platen, a mounting portion, a movement mechanism, a processor, and a memory. The memory is configured to store computer-readable instructions that, when executed by the processor, instruct the processor to perform processes including acquiring a hardness-correspondence value corresponding to a hardness of a cutting object placed on the platen, acquiring cutting data for cutting a pattern from the cutting object, setting, based on the hardness-correspondence value, an offset amount used for a rotation correction to a greater value when the hardness of the cutting object is hard than when the hardness of the cutting object is soft, correcting, using the set offset amount, data, of the cutting data, corresponding to a direction change section, and performing cutting processing to cut the cutting object using a cutting blade, by controlling the movement mechanism in accordance with the corrected cutting data.

9 Claims, 10 Drawing Sheets

FIG. 8

80

| HARDNESS-CORRESPONDENCE VALUE | THICKNESS (mm) 0 – γ | | | γ – 2γ | | | 2γ – 5γ | | |
|---|---|---|---|---|---|---|---|---|---|
| | OFFSET AMOUNT | FIRST INCISION AMOUNT | SECOND INCISION AMOUNT | OFFSET AMOUNT | FIRST INCISION AMOUNT | SECOND INCISION AMOUNT | OFFSET AMOUNT | FIRST INCISION AMOUNT | SECOND INCISION AMOUNT |
| 0 – α | β | 2γ | – | β | 2γ | – | β | 0.5γ | γ |
| α – 2α | 1.1β | 2γ | – | 1.1β | 2γ | – | 1.2β | 0.5γ | γ |
| 2α – 4α | 1.2β | 2γ | – | 1.2β | 0.5γ | 0.5γ | 1.25β | 0.5γ | 0.5γ |
| 4α OR MORE | 1.3β | 0.5γ | 0.5γ | 1.3β | 0.5γ | 0.5γ | 1.3β | 0.5γ | 0.5γ |

| COMPARATIVE EXAMPLE | WORKING EXAMPLE |
|---|---|
|  |  |

CUTTING DEVICE

CROSS REFERENCE TO RELATED APPLICATIONS

This application claims priority to Japanese Patent Application No. 2021-053547 filed Mar. 26, 2021, the content of which is hereby incorporated herein by reference in its entirety.

BACKGROUND

The present disclosure relates to a cutting device.

A known cutting device is provided with a storage device that individually stores various setting conditions corresponding to a type of a cutting object and reads out, from the storage device, setting conditions corresponding to the type of the cutting object, the type being selected by a user or being detected by the cutting device. Examples of the setting condition include a movement speed of a cutting blade, an acceleration rate of the cutting blade, a pressing force of the cutting blade with respect to the cutting object, an offset amount when cutting is started or the like, and a type of the cutting blade, for example. The cutting device performs cutting based on the read-out setting conditions.

SUMMARY

When the known cutting device cuts a pattern from the cutting object based on the set setting conditions, the cutting may not be able to be performed along the shape of the pattern at a direction change section, of the pattern, at which a cutting direction changes by a predetermined amount or more.

Embodiments of the broad principles derived herein provide a cutting device that, by setting a setting condition more appropriately than in known art, improves a cutting quality of a pattern more than in the known art.

Embodiments provide a cutting device that includes a platen, a mounting portion, a movement mechanism, a processor, and a memory. The mounting portion is configured to mount a cutting blade including a leading end portion disposed at a position separated from an axis by a predetermined distance. The cutting blade is rotatable about the axis, and the axis extends in a third direction intersecting each of a first direction and a second direction intersecting the first direction. The movement mechanism includes a motor configured to move a cutting object placed on the platen relative to the mounting portion, in the first direction and the second direction, using a power of the motor. The processor is configured to control the movement mechanism. The memory is configured to store computer-readable instructions that, when executed by the processor, instruct the processor to perform processes. The processes include hardness acquisition processing of acquiring a hardness-correspondence value corresponding to a hardness of the cutting object placed on the platen, cutting data acquisition processing of acquiring cutting data for cutting a pattern from the cutting object, and offset amount setting processing of setting, based on the hardness-correspondence value acquired by the hardness acquisition processing, an offset amount used for a rotation correction to a greater value when the hardness of the cutting object is hard than when the hardness of the cutting object is soft. The rotation correction is a correction to change an orientation of the cutting blade at a direction change section at which a direction of cutting the cutting object changes by a predetermined amount or more. The processes further include correction processing of correcting, using the set offset amount, data, of the cutting data, corresponding to the direction change section, and cutting control processing of performing cutting processing to cut the cutting object using the cutting blade mounted to the mounting portion, by controlling the movement mechanism to cause the cutting object placed on the platen to move relative to the mounting portion, in the first direction and the second direction, in accordance with the corrected cutting data.

The cutting device according to the present aspect acquires the hardness-correspondence value of the cutting object, and sets the offset amount, which is used for the rotation correction, in accordance with the hardness of the cutting object. Thus, the cutting device can set the offset amount, among the setting conditions used for cutting the cutting object, more appropriately than in the known art. As a result, the cutting device can perform the rotation correction under conditions that are more suitable for the cutting object than those in the known art. The offset amount setting processing executed by the processor of the cutting device contributes to improve the cutting quality of the pattern more than in the known art by increasing the possibility of being able to cut the cutting object along the shape of the pattern.

BRIEF DESCRIPTION OF THE DRAWINGS

Embodiments will be described below in detail with reference to the accompanying drawings in which:

FIG. 8 is an explanatory diagram of a table stored in a memory;

DETAILED DESCRIPTION

Figure 1:
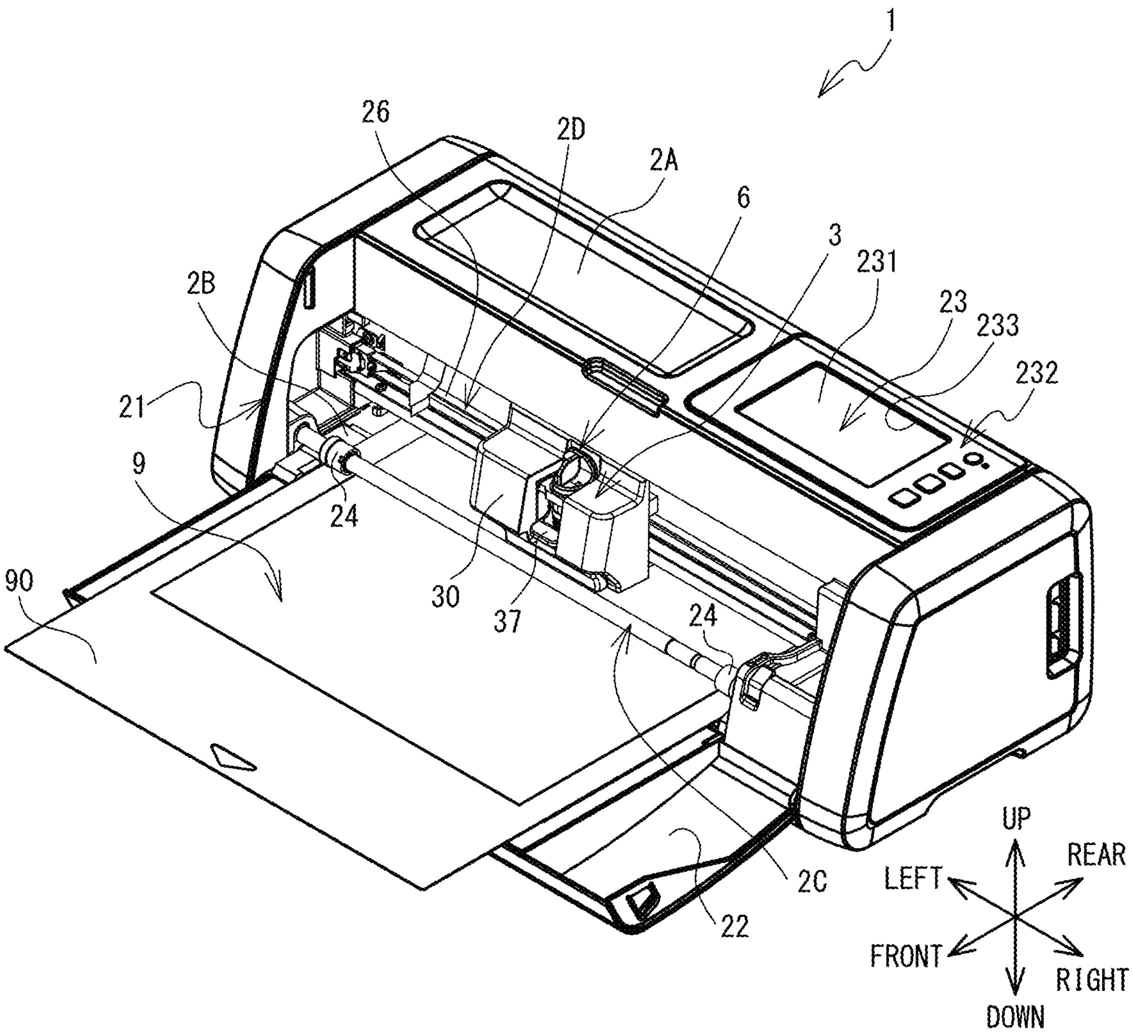
FIG. 1 is a perspective view of a cutting device.

Embodiments embodying a cutting device 1 according to the present disclosure will be described in order with reference to the drawings. The drawings to be referenced are used to illustrate the technical features that can be adopted in the present disclosure, and the described configurations and the like of the devices are not intended to be limited thereto, but are merely explanatory examples. The lower left side, the upper right side, the lower right side, the upper left side, the upper side, and the lower side in FIG. 1 are the front side, the rear side, the right side, the left side, the upper side, and the lower side, respectively, of the cutting device 1.

An overview of the cutting device 1 will be described with reference to FIG. 1 to FIG. 3. The cutting device 1 can cut a cutting object 9 held by a holding portion 90, using a cutting blade 16 held by the holder 6. The holding portion 90 is a mat made of synthetic resin material, for example. The cutting object 9 is attached to an adhesive layer on an upper surface of the holding portion 90 and held there. The cutting device 1 is provided with a main body cover 2A, a platen 2B, a carriage 3, a movement mechanism 5, and the like.

An opening portion 21, a cover 22, and an operating portion 23 are provided on the main body cover 2A. The opening portion 21 is an opening formed in a front surface portion of the main body cover 2A. The cover 22 is rotatably supported on the main body cover 2A. In FIG. 1, the cover 22 is open, and the opening portion 21 is in an open state. Hereinafter, various configurations are explained on the basis of the state in which the cover 22 is open. The operating portion 23 is located on a right side portion of an upper surface of the main body cover 2A, and provided with a liquid crystal display (LCD) 231, a plurality of operating switches 232, and a touch screen 233. An image including various items, such as commands, illustrations, setting values, and messages is displayed on the LCD 231. The touch screen 233 is provided on a surface of the LCD 231. A user performs a pressing operation on the touch screen 233, using either a finger or a stylus pen. In the cutting device 1, which of the items has been selected is recognized in accordance with a pressed position detected by the touch screen 233. The user can use the operating switches 232 and the touch screen 233 to select a pattern displayed on the LCD 231, set various parameters, perform an input operation, and the like.

The platen 2B is provided inside the main body cover 2A. The platen 2B is a plate-shaped member that extends in the left-right direction. The length of the platen 2B in the left-right direction is greater than the width of the holding portion 90 and the cutting object 9. The holding portion 90 that is conveyed to the rear by the movement mechanism 5 is placed on a portion of an upper surface of the platen 2B excluding portions at both ends in the left-right direction. In other words, the cutting object 9 held by the holding portion 90 is placed on the platen 2B via the holding portion 90.

The movement mechanism 5 is configured to move in the front-rear direction and the left-right direction relative to the cutting object 9 placed on the platen 2B and a mounting portion 3B. The movement mechanism 5 of the present disclosure includes the conveyance mechanism 2C and the movement mechanism 2D. The conveyance mechanism 2C is provided with a driven roller 24, a drive roller (not shown in the drawings), and a Y-axis motor 15 (refer to FIG. 4). The driven roller 24 is rotatably supported inside the main body cover 2A and further to the front than the platen 2B. The drive roller faces the driven roller 24 from below, and rotates in accordance with the driving of the Y-axis motor 15. The conveyance mechanism 2C clamps, between the driven roller 24 and the drive roller, left and right end portions of the rectangular-shaped holding portion 90 holding the cutting object 9. The conveyance mechanism 2C can convey the holding portion 90 in the front-rear direction (also referred to as a "Y direction"), as a result of the drive roller rotating in a state in which the holding portion 90 holds the cutting object. In other words, the conveyance mechanism 2C can convey the cutting object 9 held by the holding portion 90 in the front-rear direction.

The movement mechanism 2D is configured to move the carriage 3 in the left-right direction (hereinafter also referred to as an "X direction"). The movement mechanism 2D is provided with a guide rail 26, an X-axis motor 25 (refer to FIG. 4), and the like. The guide rail 26 is fixed inside the main body cover 2A and extends in the left-right direction. The carriage 3 can move in the X direction along the guide rail 26, and is supported by the guide rail 26. The rotational movement of the X-axis motor 25 is converted into motion in the X direction, and this motion is transmitted to the carriage 3. When the X-axis motor 25 is driven forward or in reverse, the carriage 3 is moved in the leftward direction or the rightward direction.

Figure 2:
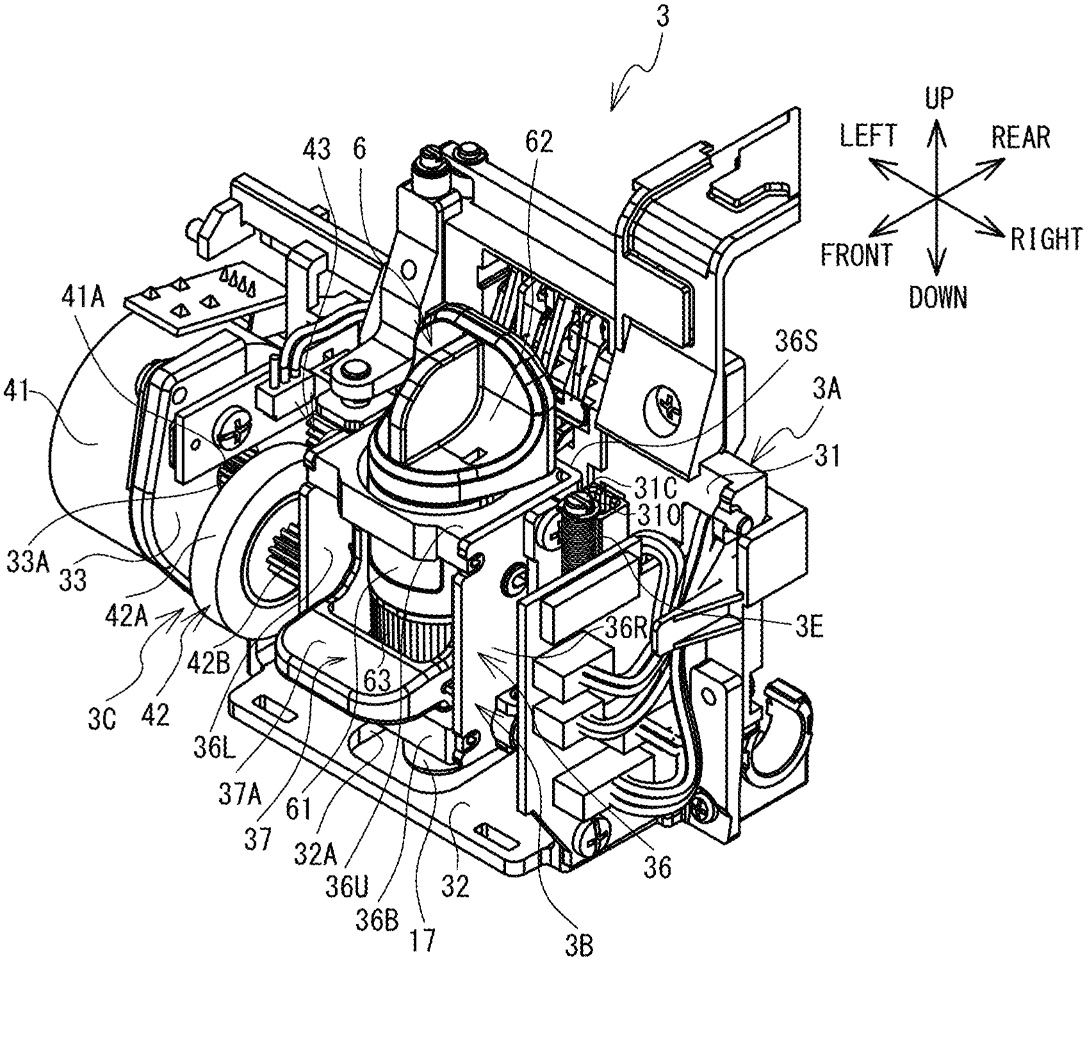
FIG. 2 is a perspective view of a carriage in a state in which a holder is mounted thereto.
Figure 3:
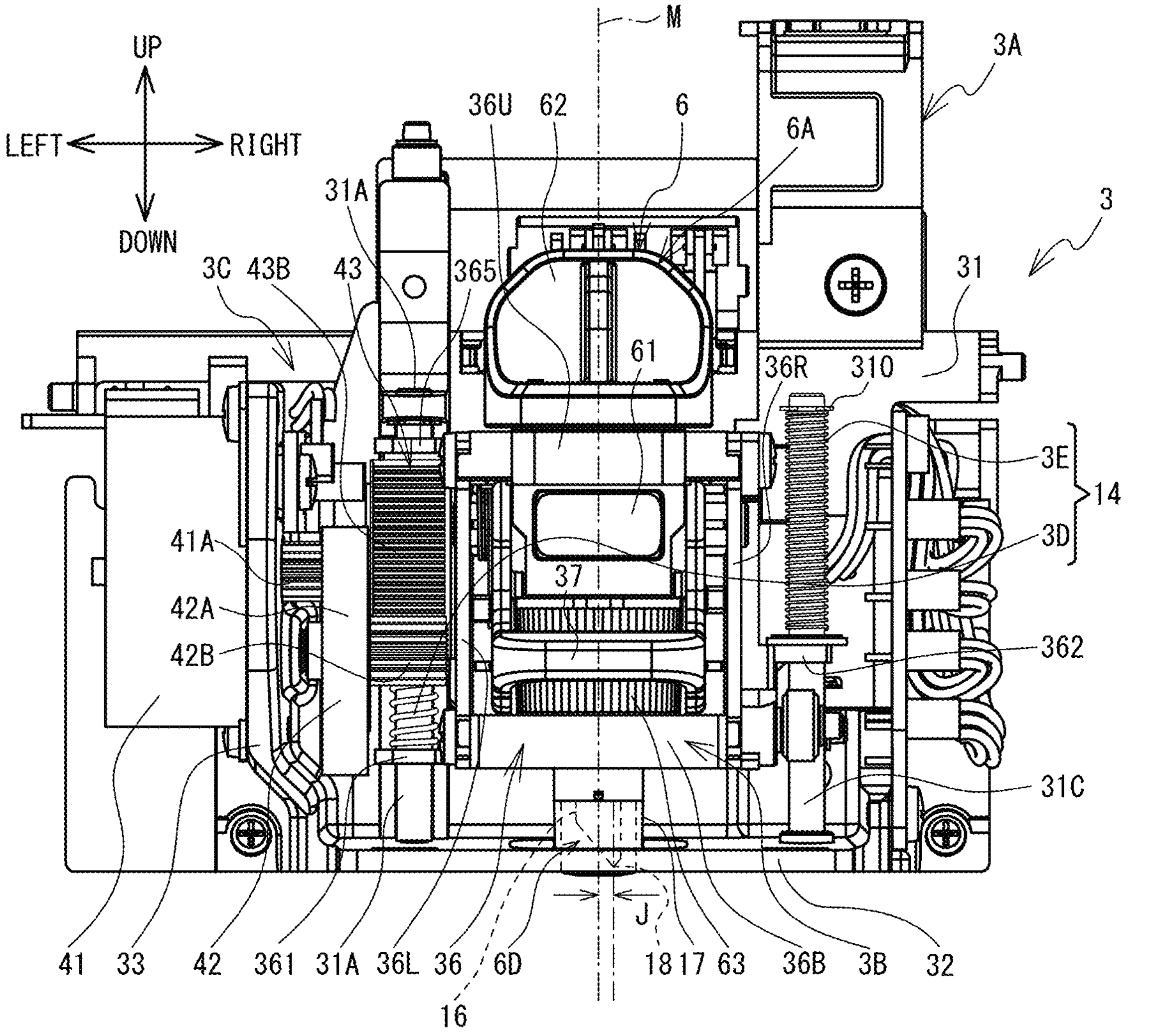
FIG. 3 is a front view of the carriage and the holder in a raised position.

As shown in FIG. 2 and FIG. 3, the carriage 3 is provided with a support body 3A, the mounting portion 3B, an approaching/separating mechanism 3C, a pressure change mechanism 14, and the like. Portions of the carriage 3 apart from a portion to which the holder 6 is mounted are covered by a cover 30 shown in FIG. 1. In FIG. 2 and FIG. 3, the cover 30 is omitted. The support bodies 3A support the mounting portion 3B, the approaching/separating mechanism 3C, the pressure change mechanism 14, and the like. The support body 3A includes base portions 31 to 33 that are each plate-shaped. The base portion 31 is orthogonal to the front-rear direction. The base portion 31 is coupled to the guide rail 26 (refer to FIG. 1) at a rear surface thereof. The base portion 31 is supported by the guide rail 26 such that the base portion 31 can move in the left-right direction. As shown in FIG. 3, support shafts 31A and 31C are provided at positions separated from the base portion 31 to the front thereof. The support shafts 31A and 31C each have a circular cylindrical shape, and extend in the up-down direction. As shown in FIG. 3, the support shaft 31A is provided in the vicinity of the left end portion of the base portion 31. A spring 3D of the pressure change mechanism 14 (to be described later) is wound around the support shaft 31A. The support shaft 31A supports a rack gear 43 to be described later, such that the rack gear 43 can move in the up-down direction. The support shaft 31C is provided in the vicinity of the right end portion of the base portion 31. A spring 3E of the pressure change mechanism 14 (to be described later) is wound around the support shaft 31C. As shown in FIG. 2 and FIG. 3, the base portion 32 is orthogonal to the up-down direction, and extends to the front from the lower end portion of the base portion 31. A through hole 32A is provided in the base portion 32 so as to penetrate the base portion 32 in the up-down direction. The base portion 33 is orthogonal to the left-right direction, and extends to the front from a position further to the left than the support shaft 31A of the base portion 31. A portion of the approaching/separating mechanism 3C to be described later is supported by the base portion 33.

The mounting portion 3B is configured such that the cutting blade 16 is mounted thereto so as to be rotatable about an axis M. The cutting blade 16 includes a leading end portion 18 at a position separated by a predetermined distance J from the axis M that extends in the up-down direction intersecting each of the front-rear direction and the left-right direction. The mounting portion 3B is disposed, from among support body 3A, to the front of the base portion 31, above the base portion 32, to the left of the support shaft 31C, and to the right of the support shaft 31A. The mounting portion 3B includes a holding body 36 and a lever 37. The holding body 36 holds the holder 6 in the state in which the holder 6 is mounted to the mounting portion 3B. The lever 37 fixes the holder 6 in the state of being held by the holding body 36, such that the holder 6 cannot be removed.

As shown in FIG. 2, the holding body 36 includes side plate portions 36S, 36R, and 36L, an upper plate portion 36U, and a bottom plate portion 36B. The side plate portion 36S is disposed to the front of the base portion 31 of the support body 3A, and is orthogonal to the front-rear direction. The side plate portion 36S is coupled to the base portion 31 such that the side plate portion 36S can move in the up-down direction. In this way, the mounting portion 3B is supported such that the mounting portion 3B can move in the up-down direction with respect to the support body 3A. The side plate portion 36R extends toward the front from the right end portion of the side plate portion 36S. The side plate portion 36L extends toward the front from the left end portion of the side plate portion 36S. The side plate portions 36R and 36L are each orthogonal to the left-right direction. The upper plate portion 36U is provided on the upper end portions of each of the side plate portions 36S, 36R, and 36L. The bottom plate portion 36B is provided on the lower end portions of each of the side plate portions 36S, 36R, and 36L. The upper plate portion 36U and the bottom plate portion 36B are each orthogonal to the up-down direction. The front end portion of the holding body 36 is open.

A circular through hole is formed in the upper plate portion 36U so as to penetrate the upper plate portion 36U in the up-down direction. A circular through hole is formed in the bottom plate portion 36B so as to penetrate the bottom plate portion 36B in the up-down direction. In a state in which the holder 6 is held by the holding body 36, the holder 6 is inserted through the through hole of the upper plate portion 36U and the through hole of the bottom plate portion 36B. In this state, the upper end portion of the holder 6 protrudes further upward than the upper plate portion 36U, and the lower end portion of the holder 6 protrudes further downward than the bottom plate portion 36B.

As shown in FIG. 3, a movable plate portion 361 is provided at the lower end portion of the side plate portion 36L, and a movable plate portion 365 is provided at the upper end portion of the side plate portion 36L. The movable plate portions 361 and 365 extend to the left from the left surface of the side plate portion 36L, and are orthogonal to the up-down direction. Through holes are formed in the movable plate portions 361 and 365 so as to penetrate the movable plate portions 361 and 365 in the up-down direction. The support shaft 31A of the support body 3A is inserted into the through holes of the movable plate portions 361 and 365. A movable plate portion 362 is provided on the side plate portion 36R. The movable plate portion 362 extends to the right from the right surface of the side plate portion 36R, and is orthogonal to the up-down direction. A through hole is formed in the movable plate portion 362 so as to penetrate the movable plate portion 362 in the up-down direction. The support shaft 31C of the support body 3A is inserted into the through hole of the movable plate portion 362.

As shown in FIG. 2, the lever 37 is slidably supported by the side plate portions 36R and 36L of the holding body 36. The lever 37 includes a plate-shaped grip portion 37A that is long in the left-right direction. In a state in which the lever 37 has slid in a direction in which the grip portion 37A moves downward, the holder 6 that is held by the holding body 36 is fixed. In this state, the holder 6 cannot be removed from the holding body 36. On the other hand, in a state in which the lever 37 has slid in a direction in which the grip portion 37A moves upward, the state of the holder 6 being fixed to the holding body 36 is released. Thus, in this state, the holder 6 can be removed from the holding body 36.

The approaching/separating mechanism 3C is controlled by a processor 2 and moves the mounting portion 3B in an approaching direction (in the downward direction) in which the mounting portion 3B approaches the platen 2B, and in a separating direction (in the upward direction) in which the mounting portion 3B separates from the platen 2B. By the mounting portion 3B moving downward, the mounting portion 3B approaches the cutting object 9 placed on the platen 2B. On the other hand, by the platen 2B moving upward, the mounting portion 3B separates from the cutting object 9 placed on the platen 2B.

As shown in FIG. 2 and FIG. 3, the approaching/separating mechanism 3C includes a Z-axis motor 41, a gear unit 42, a rack gear 43, and the like. The Z-axis motor 41 is disposed to the left of the base portion 33 of the support body 3A, and is fixed to the support body 3A by the base portion 33. A rotation shaft of the Z-axis motor 41 extends to the right and penetrates, to the right, a hole 33A formed in the base portion 33. A gear 41A is provided at the rotation shaft of the Z-axis motor 41. The gear 41A is disposed to the right of the base portion 33.

The gear unit 42 includes an internal gear 42A and a pinion gear 42B. The internal gear 42A has a circular plate shape, and is orthogonal to the left-right direction. A circular recessed portion, which is recessed to the right, is formed in the left side of the internal gear 42A. Teeth are formed on the inner side surface of the recessed portion. The pinion gear 42B is provided on the right surface of the internal gear 42A. The diameter of the pinion gear 42B is smaller than the diameter of the internal gear 42A. Positions of rotational centers of each of the internal gear 42A and the pinion gear 42B are aligned with each other, and extend in the left-right direction. Hereinafter, the rotational centers of each of the internal gear 42A and the pinion gear 42B are referred to as a "rotational center of the gear unit 42." The internal gear 42A and the pinion gear 42B rotate integrally with each other.

The gear unit 42 is provided to the right of the base portion 33 of the support body 3A, and is rotatably fixed to the base portion 33. The rotational center of the gear unit 42 is positioned below the rotational shaft of the Z-axis motor 41. The gear 41A provided on the rotational shaft of the Z-axis motor 41 is inserted, from the left, into the recessed portion formed in the left surface of the internal gear 42A. The gear 41A meshes with the teeth provided on the inner side surface of the internal gear 42A. The drive force of the Z-axis motor 41 generated in accordance with the Z-axis motor 41 being driven and the gear 41A rotating is transmitted to the gear unit 42 via the gear 41A and the internal gear 42A. In this way, the pinion gear 42B of the gear unit 42 also rotates.

The rack gear 43 is provided to the rear of the pinion gear 42B. The rack gear 43 includes a rectangular column-shaped base that extends in the up-down direction. The rack gear 43 includes gear teeth 43B on the front surface of the base. The rack gear 43 further includes a through hole in the base that penetrates the base in the up-down direction. The support shaft 31A fixed to the support body 3A is inserted into that through hole. The rack gear 43 can move up and down along the support shaft 31A. The gear teeth 43B of the rack gear 43 mesh with the pinion gear 42B. The rack gear 43 moves in the up-down direction in accordance with the rotation of the pinion gear 42B.

The pressure change mechanism 14 is configured to change a pressure, in the approaching direction, applied to the mounting portion 3B. The pressure change mechanism 14 includes the springs 3D and 3E. The spring 3D is positioned below the rack gear 43. The spring 3D is a compression coil spring, and is wound in the vicinity of the lower end portion of the support shaft 31A. The upper end portion of the spring 3D is coupled to the lower end portion of the rack gear 43. The lower end portion of the spring 3D is coupled to the movable plate portion 361 of the mounting portion 3B. The spring 3D is interposed between the rack gear 43 and the movable plate portion 361 of the mounting portion 3B, and urges the rack gear 43 upward. In this way, the upper end portion of the rack gear 43 comes into contact, from below, with the movable plate portion 365 of the mounting portion 3B, and presses the movable plate portion 365 upward. When the Z-axis motor 41 of the approaching/separating mechanism 3C is driven, the spring 3D moves the mounting portion 3B in the up-down direction in conjunction with the movement in the up-down direction of the rack gear 43. Further, when the spring 3D is compressed in accordance with the downward movement of the rack gear 43, the spring 3D applies a downward pressure on the mounting portion 3B.

The spring 3E is a compression coil spring, and is wound around the support shaft 31C. A fixing washer 310 is fixed to the upper end portion of the support shaft 31C. The upper end portion of the spring 3E is in contact, from below, with the fixing washer 310. The lower end portion of the spring 3E is coupled to the movable plate portion 362 of the mounting portion 3B. The spring 3E is interposed between the fixing washer 310 and the movable plate portion 362 of the mounting portion 3B, and applies a downward pressure to the mounting portion 3B. Regardless of a driving state of the Z-axis motor 41 of the approaching/separating mechanism 3C, the spring 3E constantly applies the downward pressure to the mounting portion 3B.

The holder 6 will be explained with reference to FIG. 1 to FIG. 3. The holder 6 is used in a state of being mounted to the mounting portion 3B, and cuts the cutting object 9 using the cutting blade 16. The holder 6 includes a housing 6A made of resin, the cutting blade 16, a cover 17, and a second spring 6F (refer to FIG. 7). The housing 6A includes a circular cylindrical portion 61, a lid portion 62, and a screw cap 63. The cylindrical portion 61 extends the up-down direction. The center of the circular cylindrical portion 61 coincides with the axis M of the cutting blade 16. The lid portion 62 closes the opening of the upper end portion of the circular cylindrical portion 61. The screw cap 63 is fixed by being screwed onto the circular cylindrical portion 61. The screw cap 63 is removed from the housing 6A when replacing the cutting blade 16. In the state in which the holder 6 is mounted to the mounting portion 3B, the housing 6A is held by the mounting portion 3B. As shown in FIG. 2, the circular cylindrical portion 61 fits into the through hole of the upper plate portion 36U of the mounting portion 3B. The screw cap 63 of the housing 6A fits into the through hole of the bottom plate portion 36B of the mounting portion 3B. The upper end of the circular cylindrical portion 61 is disposed above the upper plate portion 36U of the mounting portion 3B. As shown in FIG. 3, the lower end portion of the screw cap 63 of the housing 6A protrudes further downward than the lower end of the bottom plate portion 36B. The second spring 6F is a compression coil spring, and is extendable and contractable in the up-down direction.

A cutting edge of the cutting blade 16 includes the leading end portion 18 as a corner portion thereof and extends obliquely in a direction intersecting an extension plane of the axis M and the platen 2B. The cutting blade 16 includes the leading end portion 18 at a position separated from the axis M. In other words, the leading end portion 18 of the cutting blade 16 is biased with respect to the axis M. The cover 17 has a cylindrical shape that projects downward from the lower end of the circular cylindrical portion 61 and the cutting blade 16 is inserted into the cover 17. The second spring 6F is provided in order to apply downward pressure to the cutting blade 16 of the cutting body 6D.

As shown in FIG. 3, an uppermost position within a movable range of the mounting portion 3B in the up-down direction is referred to as a raised position. When the mounting portion 3B is at the raised position, the leading end portion 18 of the cutting blade 16 of the holder 6 mounted to the mounting portion 3B protrudes slightly further downward than the base portion 32, and is separated upward from the cutting object 9 placed on the platen 2B of the cutting device 1 via the holding portion 90. The leading end portion 18 of the cutting blade 16 is positioned above the lower end of the cover 17.

In the state in which the mounting portion 3B is disposed at the raised position, the spring 3E is compressed between the fixing washer 310 at the upper end portion thereof and the movable plate portion 362 at the lower end portion thereof. Thus, the spring 3E applies the downward pressure to the movable plate portion 362 of the mounting portion 3B. The mounting portion 3B receives the downward force from the spring 3E via the movable plate portion 362. On the other hand, the rotation of the pinion gear 42B that meshes with the rack gear 43 is suppressed by the rotation load of the Z-axis motor 41, and thus, the movement of the rack gear 43 in the up-down direction is suppressed. As a result, the downward movement of the movable plate portion 365 of the mounting portion 3B, which is in contact with the upper end portion of the rack gear 43, is also suppressed. Thus, even in the state of receiving the downward force from the spring 3E, the mounting portion 3B does not move downward and is stationary.

When cutting the cutting object 9 using the cutting blade 16, the processor 2 (refer to FIG. 4) of the cutting device 1 drives the Z-axis motor 41, and rotates the gear 41A. In accordance with the rotation of the gear 41A, the internal gear 42A and the pinion gear 42B of the gear unit 42 rotate integrally. In this way, the rack gear 43 that meshes with the pinion gear 42B moves downward. In accordance with the downward movement of the rack gear 43, the spring 3D coupled to the lower end portion of the rack gear 43 also moves downward and does not contract. Note that the mounting portion 3B is in contact with the upper end portion of the rack gear 43 via the movable plate portion 365, and is coupled to the lower end portion of the spring 3D via the movable plate portion 361. Thus, the mounting portion 3B moves downward from the raised position in accordance with the movement of the rack gear 43.

In accordance with the downward movement of the mounting portion 3B, the holder 6 also moves downward. The cutting blade 16 of the holder 6 gradually approaches the cutting object 9 positioned below the cutting blade 16, and the cover 17 and the cutting blade 16 come into contact with the cutting object 9 in this order. At this time, since the cutting blade 16 is in contact with the cutting object 9, an upward pressure acts on the mounting portion 3B via the holder 6. By continuously driving the Z-axis motor 41, the rack gear 43 moves further downward. At this time, the spring 3E applies a downward force to the mounting portion 3B via the movable plate portion 362.

There is a case in which the cutting object 9 is hard, and it is not possible to cause the cutting blade 16 to penetrate the cutting object 9 using the force applied by the spring 3E. At this time, the downward movement of the mounting portion 3B is suppressed by the upward force received by the mounting portion 3B from the cutting object 9 via the holder 6. When the pinion gear 42B rotates further in this state, the rack gear 43 moves further downward. In this way, the upper end portion of the rack gear 43 separates from the movable plate portion 365, and the rack gear 43 moves downward while compressing the spring 3D. The spring 3D applies the downward force that is stronger than the spring 3E, to the mounting portion 3B via the movable plate portion 361.

Figure 4:
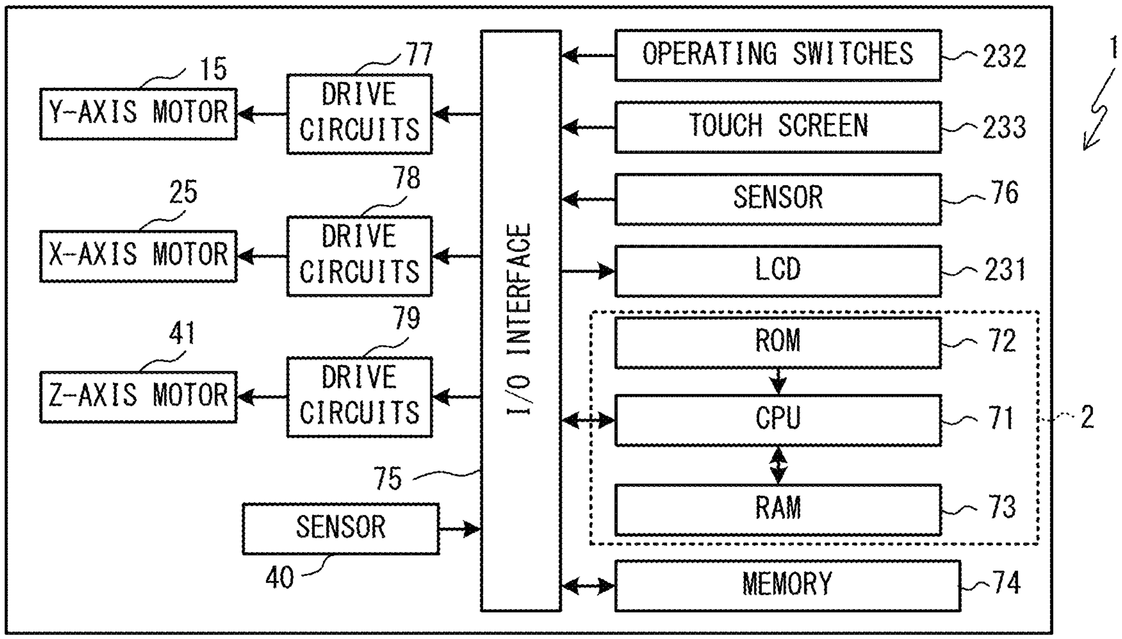
FIG. 4 is a block diagram of an electrical configuration of the cutting device.

Referring to FIG. 4, a description will be provided on an electrical configuration of the cutting device 1. The cutting device 1 includes a CPU 71, a ROM 72, a RAM 73, and an input/output ("I/O") interface 75. The CPU 71 is electrically connected to the ROM 72, the RAM 73, and the I/O interface 75. The CPU 71, the ROM 72, and the RAM 73 serve as the processor 2 that mainly controls the cutting device 1. The ROM 72 stores various programs for operating the cutting device 1. The programs include, for example, a program for enabling the cutting device 1 to execute main processing. The RAM 73 is configured to temporarily store various programs and data, setting values input using one or more of the operating switches 232, and calculation results obtained by the CPU 71 in calculation processing. A memory 74, the operating switches 232, the touch screen 233, a sensor 76, the sensor 40, the LCD 231, and drive circuits 77 to 79 are connected to the I/O interface 75. The memory 74 may be a nonvolatile storage device that stores, for example, various parameters.

The sensor 76 is configured to detect a leading end of the holding portion 90 set on the platen 2B. A detection signal output by the sensor 76 is input to the processor 2. The sensor 40 is configured to output a signal indicating the position of the mounting portion 3B in up-down direction. In the present embodiment, the processor 2 is configured to determine, based on an output of the sensor 40, the position of the mounting portion 3B in up-down direction (hereinafter, also referred to as the height of the mounting portion 3B) with reference to the position of the platen 2B. Nevertheless, in other embodiment, for example, another suitable reference may be used for determining the position of the mounting portion 3B in the up-down direction. The processor 2 is configured to control the LCD 231 to display one or more images thereon. The LCD 231 is configured to display thereon various instructions. The drive circuits 77 to 79 are configured to drive the Y-axis motor 15, the X-axis motor 25, and the Z-axis motor 41, respectively. The processor 2 is further configured to, based on cutting data, control the Y-axis motor 15, the X-axis motor 25, and the Z-axis motor 41 to perform automatic cutting on the cutting object 9 placed on the holding portion 90. The cutting data includes coordinate data used for controlling the conveyance mechanism 2C and the movement mechanism 2D. The coordinate data may be represented by a cutting coordinate system defined within a cutting area. The coordinate data includes relative positions of end points of each of a plurality of line segments representing a pattern. In the present embodiment, an origin of the cutting coordinate system may be defined at a left-rear corner of the rectangular cutting area. The right-left direction may be defined as the X-axis direction, and the front-rear direction may be defined as the Y-axis direction.

Referring to FIGS. 5 to 9, a description will be provided on the main processing. In response to receiving a start instruction by a touch-screen operation, the processor 2 of the cutting device 1 reads out a certain program from the memory 74 to store the read program in the RAM 73 and executes the main processing in accordance with instructions included in the read program. Various threshold values used in the main processing may be preassigned in consideration of cutting conditions or may be specified by the user.

Figure 5:
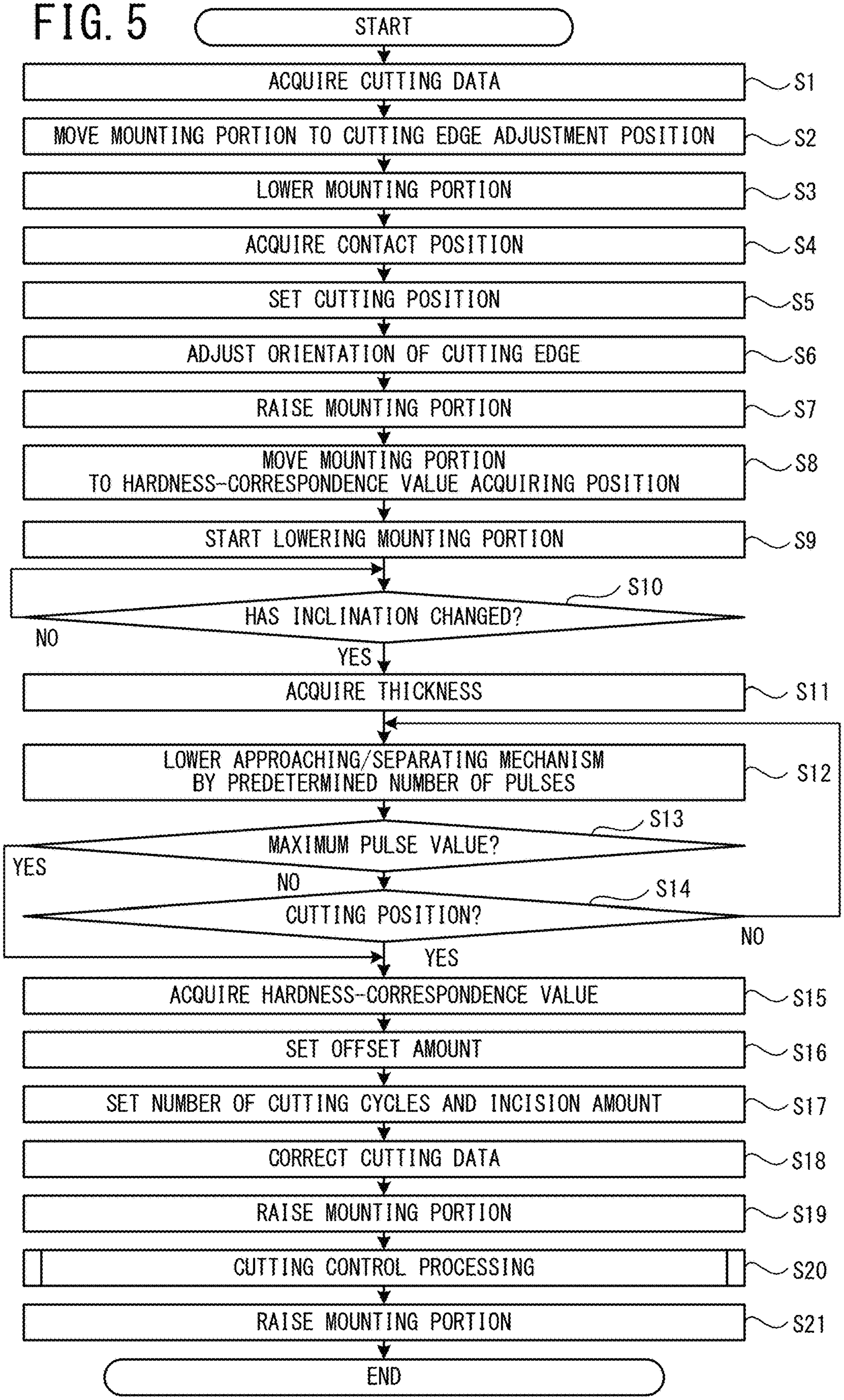
FIG. 5 is a flowchart of main processing.

As shown in FIG. 5, in the main processing, the processor 2 acquires the cutting data for cutting a pattern from the cutting object 9 (step S1). It is sufficient that processing for acquiring the cutting data be appropriately executed in accordance with a known method. In a specific example, the cutting data is acquired for cutting a pattern Q of a square shape having sides L1 to L4, as shown in FIG. 6. In accordance with the cutting data, the pattern Q is cut in the clockwise direction from a cutting start position ST on the side L1. By controlling the drive circuits 77 and 78 and driving the Y-axis motor 15 and the X-axis motor 25, the processor 2 controls the conveyance mechanism 2C and the movement mechanism 2D and causes the mounting portion 3B to move relative to the holding portion 90, to a predetermined position (step S2). Processing at step S2 is performed in a state in which the cutting blade 16 of the holder 6 mounted to the mounting portion 3B is separated from the holding portion 90 and the cutting object 9 placed on the platen 2B. The predetermined position according to the present embodiment is an adjustment position at which known processing for adjusting an orientation of a cutting edge is performed (for example, refer to Japanese Laid-Open Patent Publication No. H2-262995, the relevant portions of which are herein incorporated by reference), and more specifically, is a position inside a cutting edge adjustment region, which is a section inside the holding portion 90 shown in FIG. 1 and to the rear of the cutting object 9.

Figure 7:
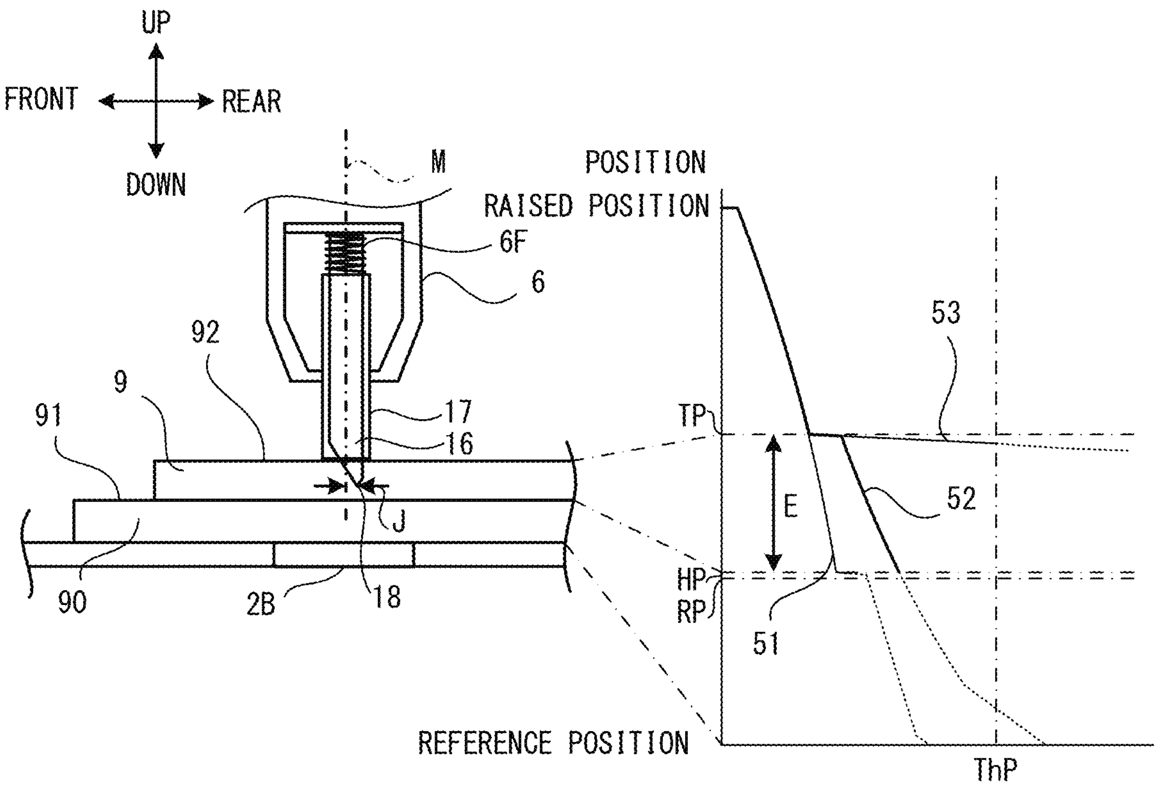
FIG. 7 is a graph showing changes in a pressure-correspondence value with respect to the height of the mounting portion holding the holder including a cutting blade.

The processor 2 controls the approaching/separating mechanism 3C by driving the Z-axis motor 41, causes the mounting portion 3B to move, from the predetermined position obtained at step S2, in the approaching direction in which the mounting portion 3B approaches the platen 2B (step S3), and acquires a contact position HP that is a position in the up-down direction output by the sensor 40 when the cutting blade 16 comes into contact with the holding portion 90 (step S4). The processor 2 counts the number of pulses input to the Z-axis motor 41 (the drive circuit 79) as a pressure-correspondence value when the mounting portion 3B moves in the up-down direction, and acquires the height of the mounting portion 3B corresponding to the pressure-correspondence value, based on a signal output from the sensor 40. As shown in an illustrative example 51 of FIG. 7, the processor 2 according to the present embodiment causes the mounting portion 3B to approach the platen 2B, and acquires, as the contact position HP, the position of the mounting portion 3B in the up-down direction at which the inclination representing the amount of change in the height of the mounting portion 3B relative to the amount of change in the pressure-correspondence value changes. As shown in FIG. 7, the contact position HP indicates a position, in the up-down direction, of a surface 91 that is a surface on the separating direction side (the upper side) of the holding portion 90. When it is detected that the inclination has changed, the processor 2 controls the approaching/separating mechanism 3C, and stops the movement of the mounting portion 3B in the approaching direction (in the downward direction).

The processor 2 sets a cutting position RP based on the acquired contact position HP (step S5). The processor 2 according to the present embodiment sets, as the cutting position RP, a position obtained by moving the mounting portion 3B downward from the contact position HP acquired by the processing at step S4 by a predetermined distance that is smaller than the thickness (the length in the up-down direction) of the holding portion 90. The thickness of the holding portion 90 may be acquired based on the output of the sensor 40, or may be stored in the memory 74, or the like in advance. For example, the thickness of the holding portion 90 is 4.0 mm. The predetermined distance may be stored in the memory 74, or the like in advance, or may be set by the user. For example, the predetermined distance is 1.0 mm.

In a state in which the cutting blade 16 is in contact with the holding portion 90 as a result of the processing at step S3, the processor 2 controls the conveyance mechanism 2C and the movement mechanism 2D, and performs the known processing for adjusting the orientation of the cutting edge to adjust an orientation of the cutting blade 16, inside the cutting edge adjustment region (step S6). The processor 2 controls the approaching/separating mechanism 3C, and causes the mounting portion 3B to move in the separating direction to the raised position (step S7). The processor 2 controls the conveyance mechanism 2C and the movement mechanism 2D, and causes the mounting portion 3B to move relative to the holding portion 90, to a hardness-correspondence value acquiring position (step S8). The hardness-correspondence value acquiring position is a position at which the cutting blade 16 is positioned above the cutting object 9. For example, the hardness-correspondence value acquiring position is set to a position in the vicinity of the cutting start position ST indicated by the cutting data acquired at step S1 and outside the pattern Q to be cut out by the cutting.

The processor 2 controls the approaching/separating mechanism 3C, and starts to lower the mounting portion 3B from the hardness-correspondence value acquiring position obtained at step S8 (step S9). The processor 2 updates, as required, the number of already output pulses output after starting the processing at step S9, in accordance with the number of pulses output to the approaching/separating mechanism 3C. Based on the output of the sensor 40, the processor 2 determines whether an inclination of the height of the mounting portion 3B corresponding to the pressure-correspondence value has changed (step S10). The processor 2 stands by at step S10 until the inclination representing the amount of change in the height of the mounting portion 3B relative to the amount of change in the pressure-correspondence value changes (no at step S10). When the processor 2 according to the present embodiment causes the mounting portion 3B to approach the platen 2B and it is detected that the inclination representing the amount of change in the height of the mounting portion 3B relative to the amount of change in the pressure-correspondence value has changed (yes at step S10), the processor 2 acquires a position TP, in the up-down direction, of the mounting portion 3B, and identifies a thickness E of the cutting object 9 (step S11). As shown in FIG. 7, the position TP indicates a position, in the up-down direction, of a surface 92 that is a surface on the separating direction side of the cutting object 9. The processor 2 identifies the contact position HP acquired at step S4 and the position TP of the surface 92 that is the surface on the separating direction side (on the upper side) of the cutting object 9, and identifies the thickness E based on a difference between the contact position HP and the position TP. In specific examples shown by illustrative examples 52 and 53 in FIG. 7, in both cases, 5γ is identified as the thickness E of the cutting object 9, using a variable γ that will be described below.

The processor 2 controls the approaching/separating mechanism 3C such that the approaching/separating mechanism 3C is lowered by an amount corresponding to a predetermined number of pulses, and increments the number of pulses measured from the processing at step S9 by the predetermined number of pulses (step S12). The processor 2 determines whether the number of pulses updated at step S12 is a maximum pulse value (step S13). The number of pulses corresponds to the pressure-correspondence value. The maximum pulse value is stored in the memory 74 in advance, for example. When the number of pulses is not the maximum pulse value (no at step S13), the processor 2 determines, based on the output of the sensor 40, whether the height of the mounting portion 3B is at the cutting position RP set at step S5 (step S14). When the height of the mounting portion 3B is not at the cutting position RP (no at step S14), the processor 2 returns the processing to step S12.

In the specific example shown by the illustrative example 52 in FIG. 7, before the number of pulses reaches the maximum pulse value (no at step S13), the height of the mounting portion 3B reaches the cutting position RP (yes at step S14). On the other hand, in the specific example shown by the illustrative example 53 in FIG. 7, before the height of the mounting portion 3B reaches the cutting position RP (no at step S14), the number of pulses reaches the maximum pulse value (yes at step S13). When the number of pulses has reached the maximum pulse value (yes at step S13), or when the height of the mounting portion 3B has reached the cutting position RP (yes at step S14), the processor 2 acquires a hardness-correspondence value corresponding to a hardness of the cutting object 9 placed on the platen 2B (step S15). The hardness-correspondence value may be the hardness of the cutting object 9 itself detected by a known method, or may be an evaluation value that serves as a guide for the hardness of the cutting object 9. A method for acquiring the hardness-correspondence value may be set as appropriate. For example, the processor 2 may acquire, as the hardness-correspondence value, a value input by the user, or may detect a type of the cutting object 9 and set, as the hardness-correspondence value, a value corresponding to the type of the cutting object 9. The processor 2 according to the present embodiment acquires the hardness-correspondence value based on the pressure-correspondence value corresponding to a pressure applied to the mounting portion 3B by the pressure change mechanism 14, and the position of the mounting portion 3B in the up-down direction. More specifically, the processor 2 acquires, as the hardness-correspondence value, the inclination representing the amount of change in the height of the mounting portion 3B relative to the amount of change in the pressure-correspondence value. In the specific example shown by the illustrative example 52 in FIG. 7, 1.5α is acquired as the hardness-correspondence value, using a variable α that will be described below, and in the specific example shown by the illustrative example 53 in FIG. 7, 4.5α is acquired as the hardness-correspondence value.

Based on the hardness-correspondence value acquired at step S15, the processor 2 sets an offset amount F to a value that is greater when the hardness of the cutting object 9 is hard than when the hardness of the cutting object 9 is soft (step S16). The offset amount F is used for a rotation correction that changes the orientation of the cutting blade 16 at a direction change section in which a direction of cutting the cutting object 9 changes by a predetermined amount or more. The predetermined amount that defines the direction change section may be set as appropriate, and is, for example, 70 degrees or more. In other words, the direction change section is a corner portion, of the pattern, having an angle of from 0 to 110 degrees. In the pattern Q having the square shape, each of four corner portions whose angles are 90 degrees, respectively, is the direction change section. The offset amount F is a variable used for the rotation correction performed to cut the direction change section inside the pattern Q into a shape following the pattern, using the cutting blade 16.

A blade edge portion of the cutting blade 16 mounted to the cutting device 1 extends in a direction intersecting the axis M, taking into account a pressure applied to the cutting blade 16 at a time of cutting processing. The holder 6 including the cutting blade 16 is mounted to the mounting portion 3B of the cutting device 1 such that a position of the axis M of the cutting blade 16 is separated from a position of the leading end portion 18 of the cutting blade 16 by the distance J. Thus, when the cutting device 1 causes the holder 6 to move with respect to the holding portion 90 in accordance with the cutting data, the position of the leading end portion 18 of the cutting blade 16 with respect to the position of the axis M is always on the downstream side, by the distance J, of a movement direction of the cutting blade 16. When the cutting device 1 causes the holder 6 to move with respect to the holding portion 90 along the pattern in a state in which the axis M is positioned at the direction change section, there may be a case in which the cutting object 9 cannot be cut along the direction change section, and a failure occurs in which the direction change section is crushed by the cutting blade 16, for example. In order to avoid such a failure, correction is made to change the orientation of the cutting blade 16 by changing a movement trajectory of the holder 6 with respect to the holding portion 90 at the direction change section. This correction is the rotation correction, and a variable used for the rotation correction is the offset amount F. In the rotation correction, the processor 2 according to the present embodiment extends a side forming a corner of the direction change section, by the offset amount F in a cutting direction, and corrects the cutting data such that an end portion of the side extended by the offset amount F is connected, in an arc shape centering on the corner of the direction change section, to the side to which the extended side is connected. When, in accordance with the cutting data on which the rotation correction has been performed, the cutting device 1 causes the mounting portion 3B to move with respect to the holding portion 90 to a position of the end portion of the side extended by the offset amount F, the leading end portion 18 of the cutting blade 16 reaches the corner of the direction change section. By further moving the mounting portion 3B with respect to the holding portion 90 from the position at which the leading end portion 18 has reached the corner portion such that the mounting portion 3B follows the arc shape, the cutting device 1 can change the orientation of the cutting blade 16 to a direction for cutting the side to which the extended side is connected.

The offset amount F is set while taking into account the fact that the orientation of the blade of the cutting blade 16 is to be changed at the direction change section. More specifically, the offset amount F is set while taking into account the distance J between the axis M and the leading end portion 18 of the cutting blade 16. Taking the distance J into account, the offset amount F is set in a range from 0.7 to 1.3 times the distance J, for example. In the cutting device 1, the greater the hardness of the cutting object 9, the more an amount that is actually cut from the cutting object 9 becomes shorter than the amount specified by the offset amount F. Thus, by setting the offset amount F to a greater value when the hardness of the cutting object 9 is hard than when the hardness of the cutting object 9 is soft, the processor 2 increases a possibility that the leading end portion 18 of the cutting blade 16 is positioned at the corner of the direction change section when the mounting portion 3B is disposed, with respect to the holding portion 90, at the end portion of the side extended by the offset amount F.

As shown in FIG. 8, the cutting device 1 according to the present embodiment stores a table 80 in the memory 74. The table 80 stores correspondence information between the hardness-correspondence value of the cutting object 9 and the offset amount F. The table 80 further stores correspondence information between the hardness-correspondence value of the cutting object 9, and a first incision amount and a second incision amount corresponding to the thickness E of the cutting object 9. In the table 80, the hardness-correspondence value is expressed using the variable $\alpha$. The greater the value of hardness-correspondence value, the greater the hardness that is indicated. The offset amount F is expressed using a variable $\beta$. The greater the value of the offset amount F, the greater the offset amount F that is indicated. $\beta$ to $1.3\beta$ fall within the range from 0.7 to 1.3 times the distance J. The thickness E of the cutting object 9, the first incision amount, and the second incision amount are expressed using the variable $\gamma$. The greater the value of each of the thickness E, the first incision amount, and the second incision amount, the greater each of the thickness E, the first incision amount, and the second incision amount that are indicated. The first incision amount is a thickness (a length in the up-down direction) cut in a first cycle and a last cycle of the cutting processing, when the pattern is cut by performing the cutting processing a plurality of times under conditions in which the position of the mounting portion 3B is changed, and while taking into account the thickness E and the hardness of the cutting object 9. The second incision amount is a thickness (a length in the up-down direction) cut in cycles of the cutting processing other than the first cycle and the last cycle, when the cutting processing is performed the plurality of times. The processor 2 performs each cycle of the cutting processing while causing the position of the mounting portion 3B to approach the cutting position RP more as the number of cycles of the cutting processing increases.

When the hardness-correspondence value acquired at step S15 is the same, on the basis of the thickness E of the cutting object 9 acquired at step S11, the processor 2 sets the offset amount F to a greater value when the thickness E of the cutting object 9 is thick than when the thickness E of the cutting object 9 is thin. For example, as shown in the table 80 in FIG. 8, when the hardness-correspondence value is in a range from $\alpha$ to $2\alpha$, the offset amount F is $1.1\beta$ when the thickness E of the cutting object 9 is in a range from 0 to $2\gamma$. In contrast to this, when the thickness E of the cutting object 9 is in a range from $2\gamma$ to $5\gamma$, the offset amount F is $1.2\beta$, which is a greater value than $1.1\beta$.

When the hardness-correspondence value is within a predetermined range, the processor 2 sets the offset amount F to a greater value as the thickness E of the cutting object 9 becomes greater. When the hardness-correspondence value of the cutting object 9 is a value of a greater hardness than the hardness-correspondence value within the predetermined range, regardless of the thickness E of the cutting object 9, the processor 2 sets the offset amount F to a fixed value greater than the offset amount F applied when the hardness-correspondence value of the cutting object 9 is within the predetermined range. The predetermined range according to the present embodiment is a range in which the hardness-correspondence value is $\alpha$ or more and less than $4\alpha$. In the specific example shown by the illustrative example 52 in FIG. 7, the processor 2 sets the offset amount F to $1.2\beta$. When the hardness-correspondence value is $4\alpha$ or more as in the specific example shown by the illustrative example 53 in FIG. 7, regardless of the thickness E of the cutting object 9, the processor 2 sets the offset amount F to 1.3β, which is a fixed value greater than 1.25β that is a maximum value of the offset amount F applied when the hardness-correspondence value of the cutting object 9 is within the predetermined range of α or more and less than 4α.

When the hardness-correspondence value is within the predetermined range, the processor 2 sets the offset amount F to a greater value as the thickness E of the cutting object 9 becomes greater. When the hardness-correspondence value of the cutting object 9 is a value when the cutting object 9 is softer than the hardness-correspondence value within the predetermined range, regardless of the thickness E of the cutting object 9, the processor 2 sets the offset amount F to a fixed value smaller than the offset amount F applied when the hardness-correspondence value of the cutting object 9 is within the predetermined range. The predetermined range according to the present embodiment is the range in which the hardness-correspondence value is α or more and less than 4α. When the hardness-correspondence value is less than α, in accordance with the table 80, and regardless of the thickness E of the cutting object 9, the processor 2 sets the offset amount F to β, which is a fixed value smaller than 1.1β that is a minimum value of the offset amount F applied when the hardness-correspondence value of the cutting object 9 is within the predetermined range of α or more and less than 4α.

Based on the corrected cutting data, and in accordance with the thickness E of the cutting object 9 acquired at step S11 and the hardness-correspondence value of the cutting object 9, the processor 2 sets the number of cycles the cutting processing is performed and the incision amount by which the cutting object 9 is cut in each cycle of the cutting processing (step S17). The processor 2 sets the first incision amount, which is the incision amount for the first cycle, to be smaller than the second incision amount, which is the incision amount for the second cycle. Based on the hardness-correspondence value of the cutting object 9, when the hardness of the cutting object 9 is greater, the processor 2 sets the smaller incision amount than when the hardness of the cutting object 9 is softer. In the specific example shown by the illustrative example 52 in FIG. 7, the first incision amount is set to 0.5γ, the second incision amount is set to γ, and the number of cutting cycles is set to 5. In the specific example shown by the illustrative example 53 in FIG. 7, both the first incision amount and the second incision amount are set to 0.5γ, and the number of cutting cycles is set to 10.

Figures 6A, 6B:
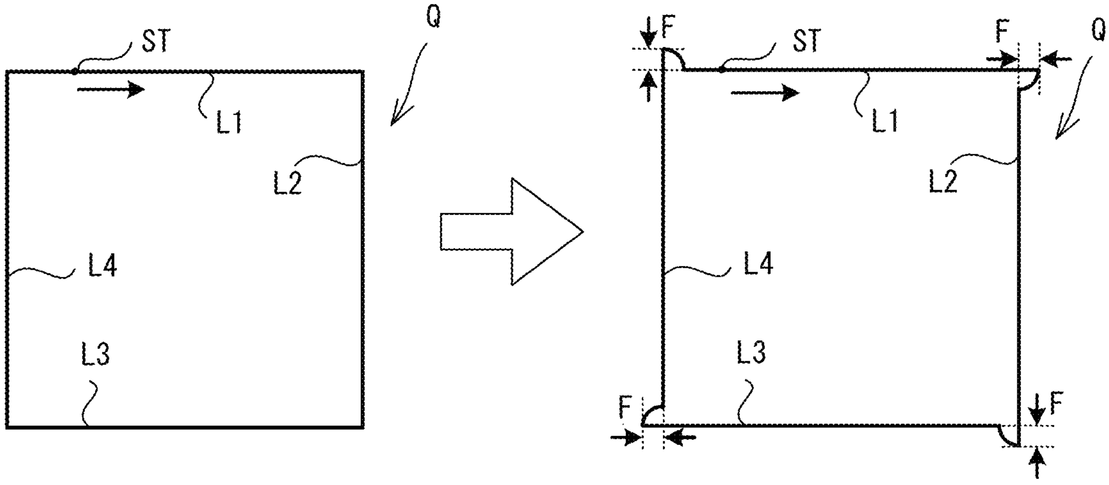
FIG. 6A is an explanatory diagram of a shape of a pattern.
FIG. 6B is an explanatory diagram of the shape of the pattern shown with movement trajectories, indicated by corrected cutting data, of a mounting portion with respect to a holding portion holding a cutting object from which the pattern is cut.

Of the cutting data, using the offset amount F set at step S16, the processor 2 corrects the data corresponding to the direction change section (step S18). The processor 2 may use a known method to correct the cutting data using the offset amount F. For example, the processor 2 corrects the cutting data using the following procedure. Base on the cutting data acquired at step S1, the processor 2 identifies the direction change section inside the pattern Q. As shown in FIG. 6B, the processor 2 corrects the cutting data such that the side L1 is extended to the right, which is the cutting direction, at a corner portion between the side L1 and the side L2, and the right end of the extended side L1 is connected, in an arc shape centering on the corner portion, to the side L2. The processor 2 corrects the cutting data of the other direction change sections in a similar manner.

The processor 2 controls the approaching/separating mechanism 3C and causes the mounting portion 3B to move in the separating direction to the raised position (step S19).

The processor 2 controls the conveyance mechanism 2C and the movement mechanism 2D in accordance with the cutting data corrected at step S18, and performs the cutting processing of cutting the cutting object 9 using the cutting blade 16 mounted to the mounting portion 3B by causing the cutting object 9 placed on the platen 2B to move relative to the mounting portion 3B in the front-rear direction and the left-right direction (step S20).

Figure 9:
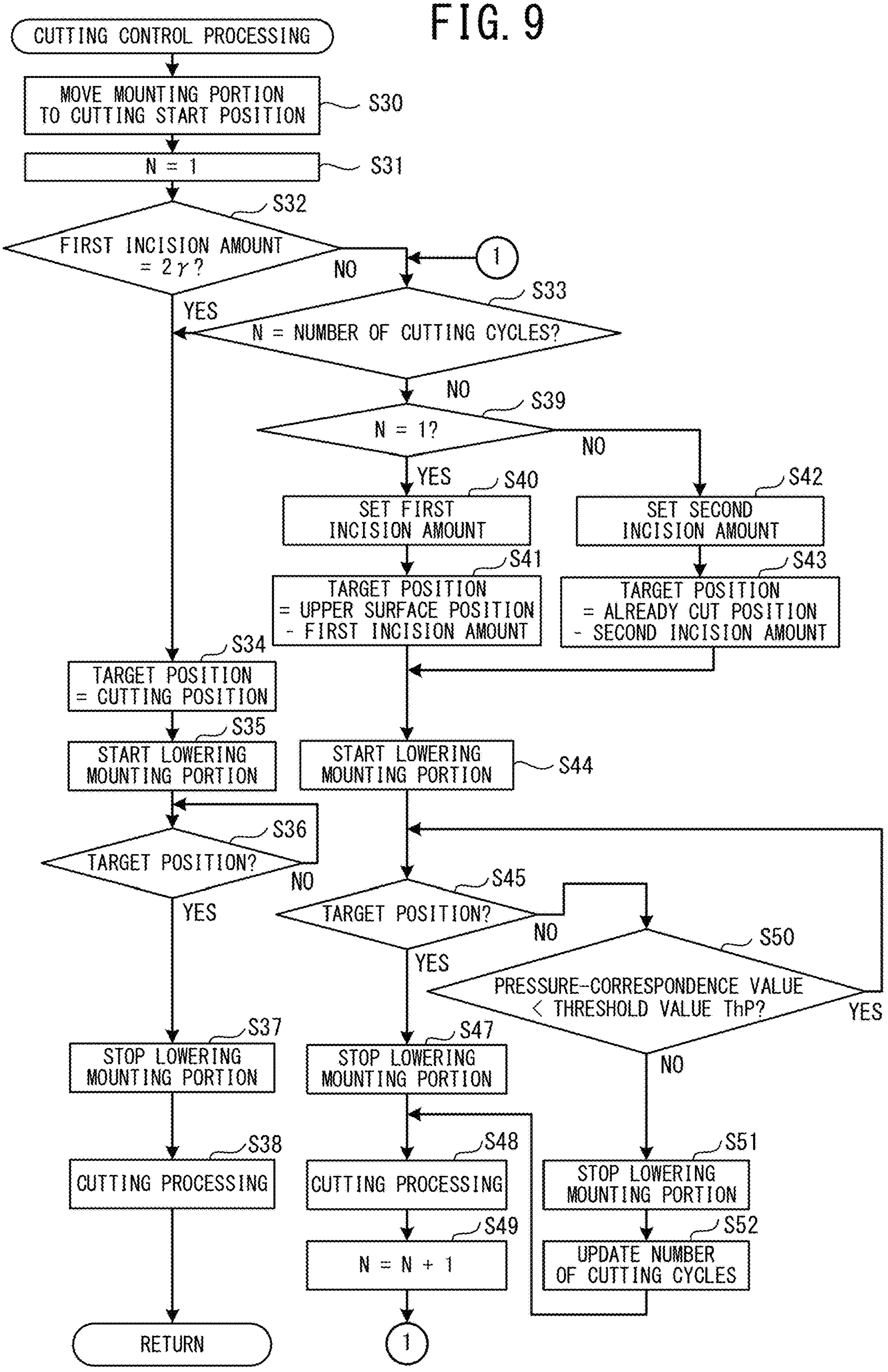
FIG. 9 is a flowchart of cutting control processing performed in the main processing shown in FIG. 5.

As shown in FIG. 9, based on the cutting data acquired at step S1, the processor 2 controls the conveyance mechanism 2C and the movement mechanism 2D, and causes the mounting portion 3B to move with respect to the holding portion 90, to the cutting start position ST (step S30). The processor 2 sets a variable N to 1 for sequentially reading out the number of cycles set at step S17 (step S31). The processor 2 determines whether the first incision amount is set to 2γ (step S32). When the first incision amount is set to 2γ (yes at step S32), the processor 2 sets the cutting position RP set at step S5, as a target position (step S34). A case in which the first incision amount is set to 2γ is a case in which it has been determined that the cutting object 9 can be cut by a single cycle of the cutting processing based on the hardness-correspondence value and the thickness E of the cutting object 9. The processor 2 controls the approaching/separating mechanism 3C, and from the cutting start position ST obtained at step S30, starts processing of lowering the mounting portion 3B toward the platen 2B (step S35). Based on the signal output from the sensor 40, the processor 2 determines whether the mounting portion 3B has reached the target position corresponding to the variable N set at step S34 (step S36). When the mounting portion 3B has not yet reached the target position (no at step S36), the processor 2 returns the processing to step S36. When the mounting portion 3B has reached the target position set at step S34 (yes at step S36), the processor 2 controls the approaching/separating mechanism 3C and stops the processing of lowering the mounting portion 3B started at step S35 (step S37), and performs the cutting processing of the N-th cycle under a condition in which the position of the mounting portion 3B in the up-down direction is set at the target position (step S38). In the processing of the N-th cycle, the processor 2 controls the conveyance mechanism 2C and the movement mechanism 2D in accordance with the cutting data corrected at step S18, and cuts the cutting object 9 using the cutting blade 16 mounted to the mounting portion 3B by causing the cutting object 9 placed on the platen 2B to move relative to the mounting portion 3B in the front-rear direction and the left-right direction. After completing the above-described steps, the processor 2 ends the cutting control processing and returns the processing to the main processing shown in FIG. 5.

When the first incision amount is not set to 2γ (no at step S32), the processor 2 determines whether the variable N is equal to the number of cutting cycles set at step S17 (step S33). A case in which the first incision amount is not set to 2γ is a case in which in which it has not been determined that the cutting object 9 can be cut by the single cycle of the cutting processing based on the hardness-correspondence value and the thickness E of the cutting object. When the variable N is equal to the number of cutting cycles set at step S17 (yes at step S33), the processor 2 performs the above-described processing at step S34. When the variable N is not equal to the number of cutting cycles (no at step S33), the processor 2 determines whether the variable N is 1 (step S39). When the variable N is 1 (yes at step S39), the processor 2 sets the first incision amount set at step S17, as the incision amount (step S40). The processor 2 sets a value obtained by subtracting the first incision amount set at step S40 from the upper surface position TP of the cutting object 9, as the target position (step S41). The upper surface position TP of the cutting object 9 is a position obtained by adding the thickness E of the cutting object 9 acquired at step S11 to the contact position HP acquired at step S4. When the variable N is not 1 (no at step S39), the processor 2 sets the second incision amount set at step S17, as the incision amount (step S42). The processor 2 sets a value obtained by subtracting the second incision amount set at step S42 from a cutting completion position of the cutting object 9, as the target position (step S43). The cutting completion position of the cutting object 9 is a position obtained by subtracting a thickness already cut by the cutting blade 16 from the upper surface position TP of the cutting object 9.

The processor 2 controls the approaching/separating mechanism 3C, and from the cutting start position ST obtained at step S30, starts the processing of lowering the mounting portion 3B toward the platen 2B (step S44). During a period in which the approaching/separating mechanism 3C is being controlled, the processor 2 determines, based on the signal output from the sensor 40, whether the position of the mounting portion 3B in the up-down direction has reached the target position set at step S41 or step S43 on the basis of the incision amount when the mounting portion 3B (step S45). When the mounting portion 3B has not reached the target position (no at step S45), the processor 2 determines, based on the number of pulses input to the Z-axis motor 41, whether the pressure-correspondence value corresponding to the pressure applied to the mounting portion 3B in the approaching direction by the pressure change mechanism 14 has reached a pressure threshold value (a threshold value ThP) during the period in which the approaching/separating mechanism 3C is being controlled (step S50). The threshold value ThP is a maximum value of the pressure-correspondence value, and is set to prevent the pressure applied to the mounting portion 3B from becoming excessively large. The threshold value ThP may be the same as or different from the maximum pulse value at step S13. When the current pressure-correspondence value is smaller than the threshold value ThP (yes at step S50), the processor 2 returns the processing to step S45. When the mounting portion 3B has reached the target position (yes at step S45), the processor 2 controls the approaching/separating mechanism 3C, stops the processing of lowering the mounting portion 3B started at step S35 (step S47), and performs the cutting processing of the N-th cycle in the same manner as at step S38 (step S48). The processor 2 increments the variable N by 1 (step S49), and returns the processing to step S33.

Before it is determined, at step S45, that the position of the mounting portion 3B in the up-down direction has reached the target position (no at step S45), when it is determined that the pressure-correspondence value has reached the threshold value ThP (no at step S50) the processor 2 stops the control of the approaching/separating mechanism 3C (step S51). After updating the number of cutting cycles set at step S17 (step S52), the processor 2 performs the cutting processing at the position of the mounting portion 3B obtained when the control of the approaching/separating mechanism 3C is stopped (step S48). In the specific example shown by the illustrative example 52 in FIG. 7, the incision amount of the first cycle is set to the first incision amount of 0.5γ (step S40), the incision amount of each of the second to fourth cycles is set to the second incision amount of γ (step S42), and the cutting processing of each of the first to fourth cycles is performed. In the cutting processing of the fifth cycle, the cutting position RP is set as the target position (step S34), and the cutting processing is performed (step S38). In the specific example shown by the illustrative example 53 in FIG. 7, the incision amount of the first cycle is set to the first incision amount of 0.5γ (step S40), the incision amount of each of the second to ninth cycles (step S42) is set to the second incision amount of 0.5γ, and the cutting processing of each of the first to ninth cycles is performed. In the cutting processing of the tenth cycle, the cutting position RP is set as the target position (step S34), and the cutting processing is performed (step S38). In FIG. 5, after step S20, the processor 2 controls the approaching/separating mechanism 3C and causes the mounting portion 3B to move in the separating direction (in the upward direction) to the raised position (step S21). After completing the above-described steps, the processor 2 ends the main processing.

An evaluation test was conducted for a cutting quality of a pattern when the pattern is cut from the cutting object 9 in accordance with the main processing of the above-described embodiment. A case in which the offset amount F, the first incision amount, and the second incision amount were not set corresponding to the hardness-correspondence value of the cutting object 9 was used as a comparative example, and a case in which the offset amount F, the first incision amount, and the second incision amount were set corresponding to the hardness-correspondence value of the cutting object 9 in accordance with the main processing of the above-described embodiment was used as a working example. The same material, cutting data, and cutting blade 16 were used in the comparative example and the working example. Specifically, the cutting blade 16 was used for which the distance J from the axis M to the leading end portion 18 was 10 mm. The material of the cutting object 9 was basswood having the thickness E of approximately 2 mm. The pattern cut in accordance with the cutting data was a square with sides of 30 mm. In the comparative example, the offset amount F was set to 11 mm, the number of cutting cycles was set to five cycles, and the first and second incision amounts were set to 0.5 mm. In the working example, the offset amount F was set to 13 mm, the number of cutting cycles was set to ten cycles, and the incision amounts were set to 0.2 mm.

Figure 10:
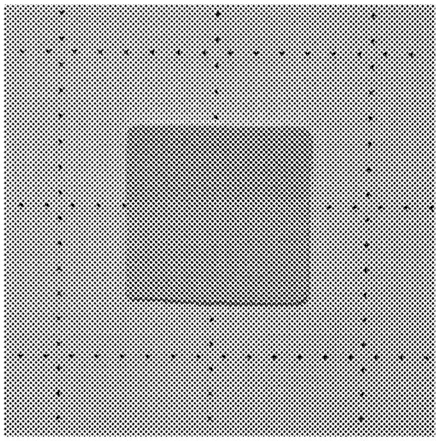
FIG. 10 is a diagram showing photographs that capture images of a cut pattern of a comparative example and a cut pattern of a working example, respectively, both of which are cut in an evaluation test.
Figure 10:
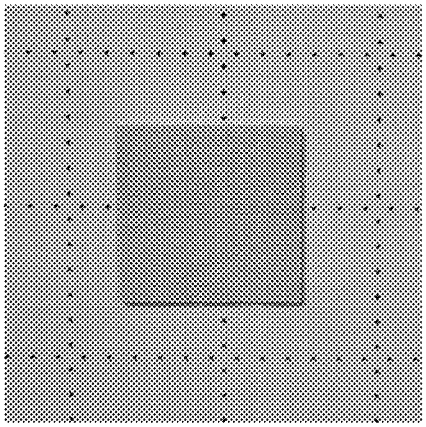

In photographs shown in FIG. 10, an interval between adjacent points in the background of the cutting pattern is 4 mm. As shown in FIG. 10, in contrast to the cutting pattern of the comparative example in which corner portions of the square were rounded, in the cutting pattern of the working example, the corner portions of the square were each cut into a shape closer to a right angle compared with the comparative example. Based on the results of the evaluation test, it was confirmed that, compared with the comparative example in which the offset amount F, the first incision amount, and the second incision amount were not set corresponding to the hardness-correspondence value of the cutting object 9, in the working example in which the offset amount F, the first incision amount, and the second incision amount were set corresponding to the hardness-correspondence value of the cutting object 9 in accordance with the main processing of the above-described embodiment, the cutting quality of the pattern could be improved as a result of increasing the possibility of being able to cut the cutting object 9 along the shape of the pattern.

The cutting device 1 according to the above-described embodiment is provided with the platen 2B, the mounting portion 3B, the movement mechanism 5, and the processor 2. The mounting portion 3B is configured to mount the cutting blade 16 including the leading end portion 18, at the position separated from the axis M by the predetermined distance such that the cutting blade 16 is rotatable about the axis M that extends in the up-down direction intersecting each of the front-rear direction and the left-right direction. The conveyance mechanism 2C and the movement mechanism 2D of the movement mechanism 5 include the X-axis motor 25 and the Y-axis motor 15, and are configured to move the cutting object 9 placed on the platen 2B relative to the mounting portion 3B in the front-rear direction and the left-right direction, using the power of the X-axis motor 25 and the Y-axis motor 15. The processor 2 can control the conveyance mechanism 2C and the movement mechanism 2D of the movement mechanism 5. The processor 2 acquires the cutting data for cutting the pattern from the cutting object 9 (step S1). The processor 2 acquires the hardness-correspondence value corresponding to the hardness of the cutting object 9 placed on the platen 2B (step S15). Based on the hardness-correspondence value acquired at step S15, the processor 2 sets the offset amount F, which is used for the rotation correction that changes the orientation of the cutting blade 16 at the direction change section at which the direction of cutting the cutting object 9 changes by the predetermined amount or more, to a greater value when the hardness of the cutting object 9 is hard than when the hardness of the cutting object 9 is soft (step S16). Of the cutting data, the processor 2 corrects the data corresponding to the direction change section using the offset amount F set at step S16 (step S18). The processor 2 performs the cutting processing of cutting the cutting object 9 by the cutting blade 16 mounted to the mounting portion 3B, by controlling the conveyance mechanism 2C and the movement mechanism 2D of the movement mechanism 5 and causing the cutting object 9 placed on the platen 2B to move relative to the mounting portion 3B in a first direction and a second direction, in accordance with the corrected cutting data (step S20).

The cutting device 1 acquires the hardness-correspondence value of the cutting object 9, and sets the offset amount F used for the rotation correction in accordance with the hardness of the cutting object 9. Thus, among the setting conditions used for cutting the cutting object 9, the cutting device 1 can set the offset amount F more appropriately than in known art. As a result, the cutting device 1 can perform the rotation correction under conditions more suitable for the cutting object 9 than those of the known art. Compared with the known art, the cutting device 1 can improve the cutting quality of the pattern by increasing the possibility of being able to cut the cutting object 9 along the shape of the pattern.

The cutting device 1 is provided with the approaching/separating mechanism 3C and the pressure change mechanism 14. The approaching/separating mechanism 3C is controlled by the processor 2, and moves the mounting portion 3B in the approaching direction in which the mounting portion 3B approaches the platen 2B and in the separating direction in which the mounting portion 3B separates from the platen 2B, the approaching direction and the separating direction each being the up-down direction. The pressure change mechanism 14 can change the pressure applied to the mounting portion 3B in the approaching direction in accordance with the movement of the approaching/separating mechanism 3C. The processor 2 acquires the hardness-correspondence value based on the pressure-correspondence value corresponding to the pressure applied to the mounting portion 3B by the pressure change mechanism 14 and on the position of the mounting portion 3B in the up-down direction (step S15). Since the cutting device 1 acquires the hardness-correspondence value of the cutting object 9 based on the pressure-correspondence value and the position of the mounting portion 3B in the up-down direction, it is possible to save the user the time and effort of inputting the hardness-correspondence value to the cutting device 1. Since the cutting device 1 acquires the hardness-correspondence value of the cutting object 9 based on the pressure-correspondence value and the position of the mounting portion 3B in the up-down direction, it is possible to inhibit a mistake in setting the hardness-correspondence value and perform the rotation correction under conditions suitable for the cutting object 9.

The processor 2 of the cutting device 1 acquires the thickness E of the cutting object 9 in the up-down direction (step S11). When the hardness-correspondence value is the same based on the thickness E of the cutting object 9 acquired at step S11, the processor 2 sets the offset amount F to a greater value when the thickness E of the cutting object 9 is thick than when the thickness E of the cutting object 9 is thin (step S16). Since the cutting device 1 sets the offset amount F of the direction change section in accordance with the hardness and the thickness E of the cutting object 9, by taking into account the hardness and the thickness E of the cutting object 9, it is possible to increase the possibility of cutting the direction change section along the pattern compared with the known art.

The processor 2 of the cutting device 1 acquires the thickness E of the cutting object 9 in the up-down direction (step S11). The processor 2 sets the number of cycles the cutting processing is performed and the incision amount by which the cutting object 9 is cut by each cycle of the cutting processing based on the corrected cutting data, and in accordance with the thickness E of the cutting object 9 acquired at step S11 and the hardness-correspondence value of the cutting object 9 (step S17). The processor 2 controls the conveyance mechanism 2C, the movement mechanism 2D, and the approaching/separating mechanism 3C, and performs the cutting processing for the number of cycles set at step S17 using the incision amount set for each cycle of the cutting processing (step S20). The cutting device 1 can cut the cutting object 9 using the number of cycles and the incision amount suitable for the cutting object 9, in accordance with the hardness and the thickness E of the cutting object 9. As a result, the cutting device 1 can increase the possibility of being able to cut the cutting object 9 along the shape of the pattern and can improve the cutting quality of the pattern, compared with a case in which the number of cycles and the incision amount suitable for the cutting object 9 are not set in accordance with the hardness and the thickness E of the cutting object 9.

When the hardness-correspondence value is within the predetermined range, the processor 2 of the cutting device 1 sets the offset amount F to a greater value as the thickness E of the cutting object 9 becomes greater (step S16). When the hardness-correspondence value of the cutting object 9 is harder than when the hardness-correspondence value is within the predetermined range, regardless of the thickness E of the cutting object 9, the processor 2 sets the offset amount F to the fixed value greater than the offset amount F applied when the hardness-correspondence value of the cutting object 9 is within the predetermined range (step S16). Even when the hardness-correspondence value exceeds the predetermined range, the cutting device 1 can prevent the offset amount F from being set to an excessively high value as a result of setting the offset amount F to a greater value as the thickness E of the cutting object 9 becomes greater.

When the hardness-correspondence value is within the predetermined range, the processor 2 of the cutting device 1 sets the offset amount F to a greater value as the thickness E of the cutting object 9 becomes greater (step S16). When the cutting object 9 is softer than when the hardness-correspondence value is within the predetermined range, regardless of the thickness E of the cutting object 9, the processor 2 sets the offset amount F to the fixed value smaller than the offset amount F applied when the hardness-correspondence value is within the predetermined range (step S16). Even when the hardness-correspondence value is smaller than in the predetermined range, the cutting device 1 can prevent the offset amount F from being set to an excessively small value as a result of setting the offset amount F to a greater value as the thickness E of the cutting object 9 becomes greater.

The processor 2 of the cutting device 1 sets the first incision amount, which is the incision amount of the first cycle, to be smaller than the second incision amount, which is the incision amount of the second cycle (step S17). The cutting device 1 can increase the possibility of cutting the cutting object 9 along the pattern, compared with a case in which a groove is formed by the cutting processing of the first cycle using the first incision amount greater than the second incision amount.

The processor 2 of the cutting device 1 sets the incision amount to a smaller value when the hardness of the cutting object 9 is hard than when the hardness of the cutting object 9 is soft, based on the hardness-correspondence value of the cutting object 9 (step S17). The cutting device 1 can set the incision amount of the cutting object 9 appropriately in accordance with the hardness-correspondence value of the cutting object 9.

The processor 2 of the cutting device 1 determines whether the pressure-correspondence value corresponding to the pressure applied to the mounting portion 3B by the pressure change mechanism 14 in the approaching direction has reached the pressure threshold value ThP during the period in which the approaching/separating mechanism 3C is being controlled (step S50). During the period in which the approaching/separating mechanism 3C is being controlled, the processor 2 determines whether the position of the mounting portion 3B in the up-down direction has reached the target position set based on the incision amount (step S45). When it is determined, at step S50, that the pressure-correspondence value has reached the threshold value ThP before it is determined, at step S45, that the position of the mounting portion 3B in the up-down direction has reached the target position (no at step S45, no at step S50), the processor 2 stops the control of the approaching/separating mechanism 3C (step S51). The processor 2 performs the cutting processing at the position of the mounting portion 3B in the up-down direction obtained when the control of the approaching/separating mechanism 3C is stopped (step S48). The cutting device 1 can inhibit the cutting blade 16 from being chipped as a result of a comparatively large pressure being applied to the cutting blade 16 mounted to the mounting portion 3B.

The cutting device according to the present disclosure is not limited to the above-described embodiment, and various changes may be made as long as they do not depart from the gist of the present disclosure. For example, the configuration of the cutting device 1 may be changed as appropriate. The cutting device 1 may be able to perform processing such as drawing other than the cutting, in addition to the cutting by the cutting blade 16. It is sufficient that the movement mechanism 5 of the cutting device 1 be able to move the mounting portion 3B and the holding portion 90 relative to each other in the first direction and the second direction. For example, the movement mechanism 5 may be able to move the mounting portion 3B in the first direction and the second direction while the position of the holding portion 90 is fixed. A number of a motor of the movement mechanism 5 may be changed as appropriate. The first direction, the second direction, a third direction, the approaching direction, and the separating direction may be changed as appropriate. It is sufficient that the holding portion 90 be able to hold the cutting object 9, and the holding portion 90 may be a mat-shaped member, or a tray-shaped member, for example. It is sufficient that the sensor 40 be able to detect the position of the mounting portion 3B in the third direction, and an arrangement, a configuration, and the like of the sensor 40 may be changed as appropriate. The sensor 40 may be an encoder that detects a movement amount of a slit provided at the mounting portion 3B, or may be a sensor that detects a magnitude and a direction of a magnetic field generated by a magnet provided at the mounting portion 3B, for example. A reference position for the position of the mounting portion 3B in the third direction output by the sensor 40 may be changed as appropriate. It is sufficient that the pressure change mechanism 14 be able to change the pressure applied to the mounting portion 3B toward the platen 2B side, and the pressure change mechanism 14 may be an urging member (a torsion spring, for example) other than the compression coil spring. The pressure change mechanism 14 may be an air cylinder that applies a force to the mounting portion 3B in the approaching direction, for example.

The main processing of FIG. 5 may be executed by a processor such as a microcomputer, a special application specific integrated circuit ("ASIC,"), and a field programmable gate array ("FPGA") instead of the processor 2. The cutting processing disclosed in the illustrative embodiments may be executed by a plurality of processors. The memory 74 storing the program for executing the cutting processing may be, for example, another non-transitory computer-readable storage medium such as an HDD, SDD, or a hybrid of HDD and SSD. Any non-transitory computer-readable storage medium may be adopted as long as storing information irrespective of a period for storing information. A non-transitory computer-readable storage medium might not necessarily include a transitory computer-readable storage medium (e.g., a signal). The program for executing the main processing may be downloaded from a server connected to a network (i.e., transmitted to the cutting device 1 as signals) and stored in the memory 74 of the cutting device 1. In such a case, the program may be stored in a non-transitory computer-readable storage medium such as an HDD of the server. In the main processing according to the illustrative embodiments, the processor 2 might not necessarily execute the steps in the above-described order and may skip one or more of the steps. The main processing may include one or more other steps. The scope of the disclosure includes a case where, for example, an operating system ("OS") running on the cutting device 1 executes part or all of actual processing based on an instruction provided by the processor 2 of the cutting device 1 and the functions of the above-described illustrative embodiments are realized.

The predetermined position at step S2 may be changed as appropriate. The predetermined position at step S2 is preferably a location at which the cutting object 9 is not placed, and specifically, is preferably a region other than a cuttable region set for the holding portion 90. When the cutting device 1 can specify a location at which the cutting object 9 is disposed, the predetermined position at step S2 may be determined based on the arrangement of the cutting object 9. In this case, the predetermined position at step S2 may be inside the cuttable region. The processing of acquiring the cutting position RP may be performed in a period separate from a period in which the processing of adjusting the orientation of the cutting blade 16 is performed at step S3 to step S7. The processing at step S6 may be omitted as necessary.

The pressure-correspondence value and the hardness-correspondence value may be changed as appropriate. When the cutting device 1 is provided with a pressure sensor, a pressure sensor value may be used as the pressure-correspondence value, for example. It is sufficient that the hardness-correspondence value serve as a scale that indicates a magnitude of a force resisting an applied force, when a force is applied to the cutting object 9 by another object. When the cutting device 1 is provided with a hardness sensor, a hardness sensor value may be used as the hardness-correspondence value, for example.

A method for setting the offset amount F based on the hardness-correspondence value may be changed as appropriate. The table 80 maybe changed as appropriate. Instead of setting the offset amount F with reference to the table 80, the processor 2 may set the offset amount F by substituting the hardness-correspondence value in a predetermined calculation formula. It is sufficient that the table 80 store the relationship between the hardness-correspondence value and the offset amount F, and the table 80 need not necessarily store at least one selected from the group of the offset amount F, the first incision amount, and the second incision amount corresponding to the thickness E of the cutting object 9. It is sufficient that the processor 2 be able to set the offset amount F to a greater value when the hardness of the cutting object 9 is hard than when the hardness of the cutting object 9 is soft, in accordance with the hardness-correspondence value, and the processor 2 need not necessarily be able to set the offset amount F corresponding to the thickness E of the cutting object 9. The processor 2 may set the offset amount F to a greater value when the hardness of the cutting object 9 is hard than when the hardness of the cutting object 9 is soft, in accordance with the hardness-correspondence value, regardless of whether the hardness-correspondence value is within the predetermined range.

The processor 2 need not necessarily set the number of cycles of the cutting processing, the first incision amount, and the second incision amount in accordance with the hardness-correspondence value and the thickness E of the cutting object 9. The first incision amount may be greater than the second incision amount. For example, and the second incision amount, the processor 2 may set the cutting position RP as the target position without setting the number of cycles of the cutting processing, the first incision amount, and may perform the cutting processing either at the cutting position RP or at a position in the up-down direction at which the pressure-correspondence value becomes the threshold value ThP, using similar processing as the processing at steps S45, S47, S48, S50, and S51.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A cutting device comprising:

a platen;

a mounting portion configured to mount a cutting blade including a leading end portion disposed at a position separated from an axis by a predetermined distance, the cutting blade being rotatable about the axis, and the axis extending in a third direction intersecting each of a first direction and a second direction intersecting the first direction;

a movement mechanism including a motor, the motor configured to move a cutting object placed on the platen relative to the mounting portion, in the first direction and the second direction;

a memory storing computer-readable instructions; and a processor configured to control the movement mechanism and configured to execute:

acquiring a hardness-correspondence value corresponding to a hardness of the cutting object placed on the platen;

acquiring cutting data for cutting a pattern from the cutting object;

setting an offset amount for a rotation correction to a greater value when the hardness of the cutting object is hard than when the hardness of the cutting object is soft, the rotation correction changing an orientation of the cutting blade at a direction change section at which a direction of cutting the cutting object changes by a predetermined amount or more;

correcting the data, corresponding to the direction change section of the cutting data with the offset amount; and cutting the cutting object with the cutting blade mounted to the mounting portion, by controlling the movement mechanism to cause the cutting object placed on the platen to move relative to the mounting portion, in the first direction and the second direction, in accordance with the cutting data.

2. The cutting device according to claim 1, further comprising:

an approaching/separating motor controlled by the processor and configured to move the mounting portion in an approaching direction and a separating direction, the approaching direction being a direction, of the third direction, in which the mounting portion approaches the platen, and the separating direction being a direction, of the third direction, in which the mounting portion separates from the platen; and a pressure change spring configured to change a pressure applied to the mounting portion in the approaching direction, in accordance with a movement of the approaching/separating motor, wherein the processor further configured to execute:

acquiring the hardness-correspondence value based on a pressure-correspondence value corresponding to the pressure applied to the mounting portion by the pressure change spring, and on a position of the mounting portion in the third direction.

3. The cutting device according to claim 2, wherein the processor further configured to execute:

acquiring a thickness of the cutting object in the third direction; and setting a number of cycles the cutting processing is performed and an incision amount by which the cutting object is cut by each cycle of the cutting processing, based on the cutting data, and in accordance with the thickness of the cutting object and the hardness-correspondence value of the cutting object, and controlling the movement mechanism and the approaching/separating motor, and performing the cutting processing for the set number of cycles using the incision amount set for each cycle of the cutting processing.

4. The cutting device according to claim 3, wherein the processor further configured to execute:

setting a first incision amount to be smaller than a second incision amount, the first incision amount being the incision amount of a first cycle of the number of cycles, and the second incision amount being the incision amount of a second cycle of the number of cycles.

5. The cutting device according to claim 3, wherein the processor further configured to execute:

setting the incision amount to a smaller value when the hardness of the cutting object is hard than when the hardness of the cutting object is soft, based on the hardness-correspondence value of the cutting object.

6. The cutting device according to claim 3, wherein the processor further configured to execute:

determining whether the pressure-correspondence value corresponding to the pressure applied to the mounting portion by the pressure change spring in the approaching direction reaches a pressure threshold value during a period in which the approaching/separating motor is being controlled; and determining whether a position of the mounting portion in the third direction reaches a target position set based on the incision amount, during the period in which the approaching/separating motor is being controlled, and when it is determined that the pressure-correspondence value reaches the pressure threshold value before it is determined that the position of the mounting portion in the third direction reaches the target position, stopping the control of the approaching/separating motor and performing the cutting processing at a position, of the mounting portion in the third direction, obtained when the control of the approaching/separating motor is stopped.

7. The cutting device according to claim 1, wherein the processor further configured to execute:

acquiring a thickness of the cutting object in the third direction, and setting, under a condition that the hardness-correspondence value is fixed, based on the thickness of the cutting object, the offset amount to a greater value when the thickness of the cutting object is thick than when the thickness of the cutting object is thin.

8. The cutting device according to claim 7, wherein the processor further configured to execute:

when the hardness-correspondence value is within a predetermined range, setting the offset amount to a value relative to the the thickness of the cutting object, and when the hardness-correspondence value of the cutting object is a value obtained when the cutting object is harder than when the hardness-correspondence value is within the predetermined range, setting the offset amount to a fixed value greater than the offset amount applied when the hardness-correspondence value of the cutting object is within the predetermined range, regardless of the thickness of the cutting object.

9. The cutting device according to claim 7, wherein the processor further configured to execute:

when the hardness-correspondence value is within a predetermined range, setting the offset amount to a greater value the greater the thickness of the cutting object, and when the hardness-correspondence value of the cutting object is a value obtained when the cutting object is softer than when the hardness-correspondence value is within the predetermined range, setting the offset amount to a fixed value smaller than the offset amount applied when the hardness-correspondence value of the cutting object is within the predetermined range, regardless of the thickness of the cutting object.

* * * * *